(12) United States Patent
Kanai

(10) Patent No.: US 9,399,412 B2
(45) Date of Patent: Jul. 26, 2016

(54) VEHICLE SEAT SLIDE DEVICE

(75) Inventor: Yuya Kanai, Yokohama (JP)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/416,192

(22) PCT Filed: Jul. 23, 2012

(86) PCT No.: PCT/JP2012/068576
§ 371 (c)(1),
(2), (4) Date: May 13, 2015

(87) PCT Pub. No.: WO2014/016888
PCT Pub. Date: Jan. 30, 2014

(65) Prior Publication Data
US 2015/0298580 A1    Oct. 22, 2015

(51) Int. Cl.
| | |
|---|---|
| *F16M 13/00* | (2006.01) |
| *B60N 2/07* | (2006.01) |
| *B60N 2/02* | (2006.01) |
| *A47C 1/00* | (2006.01) |
| *A61G 15/00* | (2006.01) |

(Continued)

(52) U.S. Cl.
CPC ............ *B60N 2/0722* (2013.01); *B60N 2/0715* (2013.01); *B60N 2/06* (2013.01); *B60N 2/07* (2013.01); *B60N 2/073* (2013.01); *B60N 2/0727* (2013.01); *B60N 2205/20* (2013.01)

(58) Field of Classification Search
CPC ...... B60N 2/0722; B60N 2/0715; B60N 2/06; B60N 2/07; B60N 2/073; B60N 2/0727

USPC .......... 248/424, 429, 430; 49/420; 297/344.1, 297/340, 341; 16/91; 296/65.13–65.15
See application file for complete search history.

(56) References Cited

U.S. PATENT DOCUMENTS 2,650,387 A * 9/1953 Foss ................................. 16/91
3,283,444 A * 11/1966 Andres .......................... 49/420

(Continued)

FOREIGN PATENT DOCUMENTS

| CN | 1353965 A | 6/2002 |
|---|---|---|
| JP | 08-127270 A | 5/1996 |

(Continued)

OTHER PUBLICATIONS

International Search Report in PCT/JP2012/068576 dated Aug. 28, 2012, 3 pages.

(Continued)

*Primary Examiner* — Syed A Islam
*Assistant Examiner* — Taylor Morris
(74) *Attorney, Agent, or Firm* — Foley & Lardner LLP

(57) ABSTRACT

A vehicle seat slide device includes: a moveable rail capable of sliding along the fixed rail; a main roller provided on each of opposite end portions of the moveable rail in a longitudinal direction and capable of rolling on a bottom wall of the fixed rail; a bracket turnably supported on the moveable rail via a pin; a biasing unit attached to the moveable rail and constantly applying a rotational biasing force to the bracket about the pin by pushing one end portion of the bracket; and a sub roller arranged on another end portion of the bracket and capable of rolling with the sub roller constantly in sure contact with the top wall of the fixed rail in response to the rotational biasing force.

10 Claims, 2 Drawing Sheets

(51) Int. Cl.
*B60N 2/00* (2006.01)
*B60N 2/06* (2006.01)

(56) References Cited

U.S. PATENT DOCUMENTS

| | | | | |
|---|---|---|---|---|
| 3,613,313 | A | * | 10/1971 | Helmick .......................... 49/420 |
| 3,716,890 | A | * | 2/1973 | Benson ............................. 16/91 |
| 3,879,893 | A | * | 4/1975 | Helmick .......................... 49/420 |
| 6,578,810 | B2 | * | 6/2003 | Eguchi et al. .................. 248/430 |
| 7,261,378 | B2 | * | 8/2007 | Dowty et al. ................. 297/344.1 |
| 7,334,676 | B1 | * | 2/2008 | McGourin et al. ......... 198/626.6 |
| 7,401,692 | B2 | * | 7/2008 | Kim .............................. 198/332 |
| 7,918,507 | B2 | * | 4/2011 | Schmale ....................... 297/341 |
| 2001/0013570 | A1 | * | 8/2001 | Yoshida et al. ............... 248/429 |
| 2002/0056798 | A1 | * | 5/2002 | Eguchi et al. ................ 248/429 |
| 2011/0233371 | A1 | * | 9/2011 | Kitamura et al. ............ 248/430 |

FOREIGN PATENT DOCUMENTS

| | | |
|---|---|---|
| JP | 10-287154 A | 10/1998 |
| JP | 2003-039997 A | 2/2003 |
| JP | 2007-069694 | 3/2007 |

OTHER PUBLICATIONS

Written Opinion of the International Search Authority in PCT/JP2012/068576 dated Aug. 28, 2012, 3 pages.
Office Action dated Jan. 4, 2016, in corresponding Chinese application No. 201280074864.7, and English translation 8 pages.

* cited by examiner

VEHICLE SEAT SLIDE DEVICE

CROSS REFERENCE TO RELATED APPLICATIONS

The present application is a U.S. National Stage of International Application No. PCT/JP2012/068576 filed on Jul. 23, 2012, the entire disclosure of which is incorporated herein by reference.

TECHNICAL FIELD

The present invention relates to a seat slide device designed to be mounted on a vehicle such as an automobile.

BACKGROUND ART

Patent Literature 1 proposes a related vehicle seat slide device including: a lower rail formed in an inverted U-shape in cross section, with left and right opening edges bent inward in opposite directions, thereby forming top walls parallel with a bottom wall; an upper rail provided at longitudinally opposite end portions thereof with main rollers which roll on the bottom wall and with which the upper rail moves along the lower rail; sub rollers provided near the main rollers; and a coil spring which upwardly biases the sub rollers and brings them into contact with the top walls, while using the reaction force the sub roller receives during this state to bring the main rollers into contact with the bottom wall.

CITATION LIST

Patent Literature

Patent Literature 1: Japanese Unexamined Patent Application Publication No. 2007-069694

SUMMARY OF INVENTION

In such a related technique, various members are mounted within a narrow space inside the seat slide device, and the mounting of each of these members requires many processes and is therefore troublesome. Moreover, there is a possibility that the coil spring and other members may resonate with vibrations of the vehicle during travel and generate noises.

An object of the present invention is to provide a vehicle seat slide device allowing simplification of the processes of mounting various members and also suppression of generation of noises due to vibrations of the vehicle during travel.

An aspect of the present invention is a vehicle seat slide device, including: a fixed rail formed in a substantially U-shape in cross section with left and right opening edges bent inward in opposite directions and with a top wall substantially parallel with a bottom wall; a moveable rail arranged inside the opening edges of the fixed rail and capable of moving along the fixed rail; a main roller provided on each of opposite end portions of the moveable rail in a longitudinal direction of the moveable rail and capable of rolling on the bottom wall of the fixed rail upon movement of the moveable rail; a bracket vertically turnably supported on the moveable rail via a pin; a biasing unit attached to the moveable rail and constantly applying a rotational biasing force to the bracket about the pin by pushing one end portion of the bracket; and a sub roller arranged on another end portion of the bracket on an opposite side of the pin from the one end portion and capable of rolling with the sub roller constantly in pressure contact with the top wall of the fixed rail in response to the rotational biasing force applied by the biasing unit.

The vehicle seat slide device may further include a lever provided on the one end portion of the bracket, and the biasing unit may be a plate spring which pushes the lever.

According to the above configuration, the processes of mounting various members are simplified, and the generation of noises due to vibrations of the vehicle during travel is suppressed.

DESCRIPTION OF EMBODIMENTS

Figure 1:
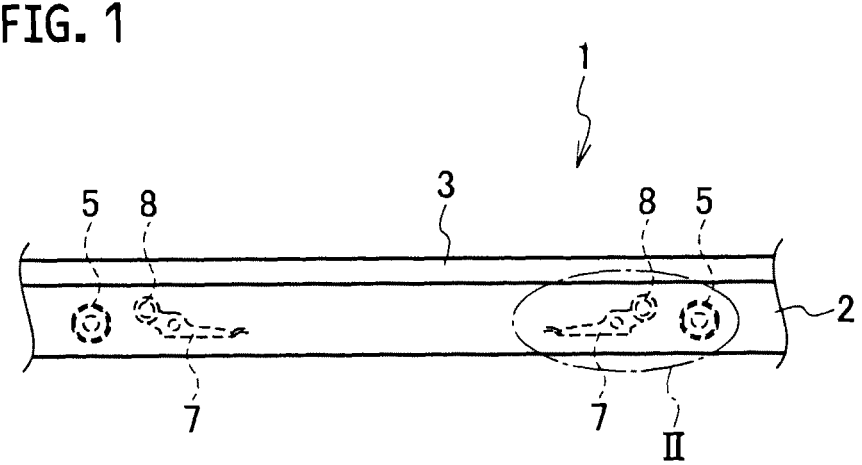
FIG. 1 is a side view of a vehicle seat slide device according to one embodiment of the present invention.
Figure 2:
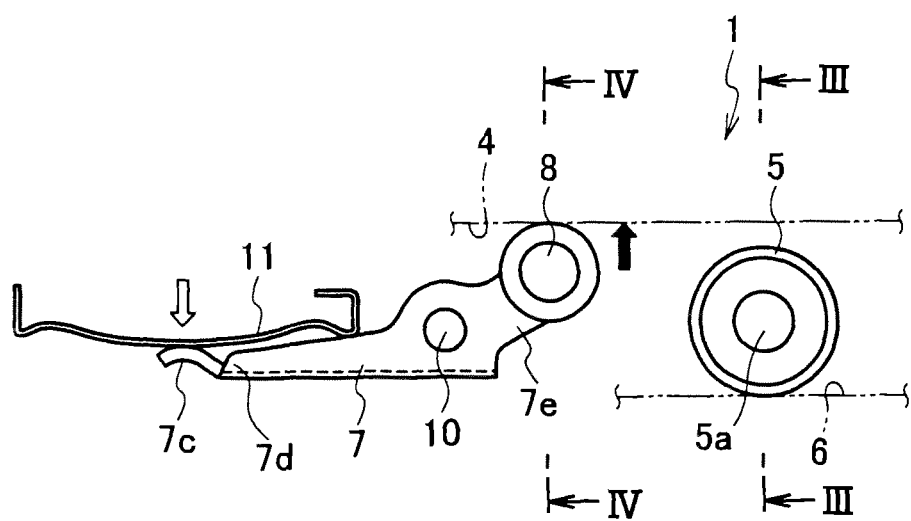
FIG. 2 is an enlarged explanatory view of a part II in FIG. 1.
Figure 3:
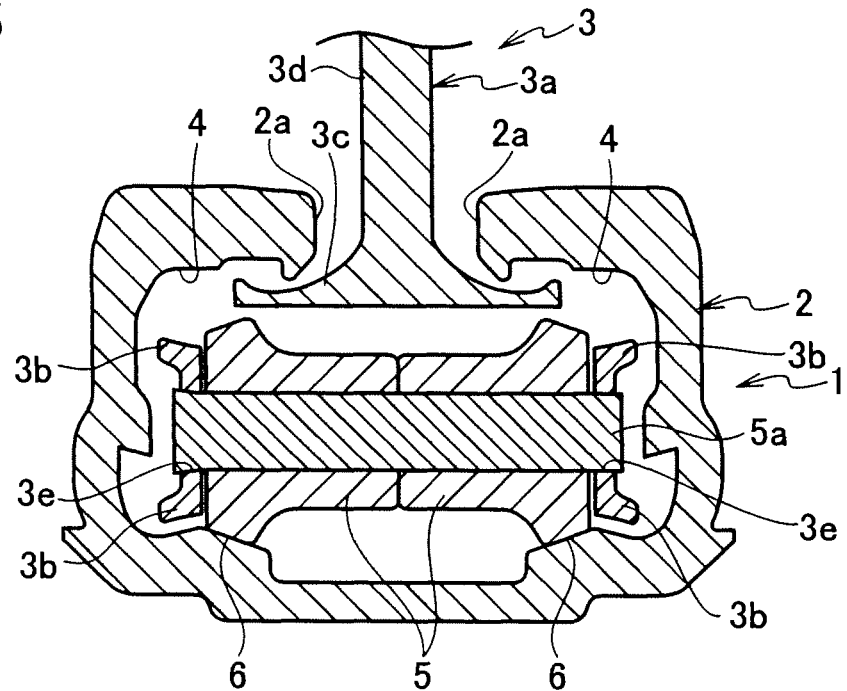
FIG. 3 is a cross-sectional view taken along a line III-III in FIG. 2.

The object of providing a vehicle seat slide device allowing simplification of the processes of mounting various members and also suppression of generation of noises due to vibrations of the vehicle during travel is achieved by the following configuration. Specifically, the configuration includes: a fixed rail formed in a substantially U-shape in cross section with left and right opening edges bent inward in opposite directions and with a top wall substantially parallel with a bottom wall; a moveable rail arranged inside the opening edges of the fixed rail and capable of moving along the fixed rail; a main roller provided on each of opposite end portions of the moveable rail in a longitudinal direction of the moveable rail and capable of rolling on the bottom wall of the fixed rail upon movement of the moveable rail; a bracket vertically turnably supported on the moveable rail via a pin; a biasing unit attached to the moveable rail and constantly applying a rotational biasing force to the bracket about the pin by pushing one end portion of the bracket; and a sub roller arranged on another end portion of the bracket on an opposite side of the pin from the one end portion and capable of rolling with the sub roller constantly in pressure contact with the top wall of the fixed rail in response to the rotational biasing force applied by the biasing unit.

Hereinbelow, a vehicle seat slide device 1 according to one embodiment of the present invention will be described with reference to FIGS. 1 to 4. The vehicle seat slide device 1 includes a fixed rail 2, a moveable rail 3, main rollers 5, 5, and brackets 7, 7, a lever 7c, sub rollers 8, and a biasing unit.

The fixed rail 2 is formed in a substantially U-shape in cross section, with left and right opening edges 2a, 2a bent inward in opposite directions. Thus, there are formed bottom walls 6, 6 and top walls 4, 4 at positions substantially parallel with the bottom walls 6, 6.

The moveable rail 3 is formed by extrusion as a T-shaped portion 3a having an inverted T-shaped cross section, and side portions 3b joined to the T-shaped portion 3a and formed below the T-shaped portion 3a. An unillustrated publicly-known seat-cushion frame is coupled to a flat plate portion 3d extending upward from the center of a flange portion 3c of the T-shaped portion 3a of the moveable rail 3. The side portions 3b, the flange portion 3c, and a lower side of the flat plate portion 3d of the moveable rail 3 are arranged inside the fixed rail 2. The lower side of the flat plate portion 3d is arranged inside the opening edges 2a, 2a of the fixed rail 2 slidably in the front-rear direction along the fixed rail 2. Thus, the moveable rail 3 is slidable in the front-rear direction along the fixed rail 2.

The main rollers 5, 5 are rotatably supported on longitudinally opposite end portions of the moveable rail 3. More specifically, the main rollers 5, 5 are mounted to the moveable rail 3 from the left and right sides, and are rotatably supported on the moveable rail 3 via a pin 5a press-fitted in through-holes 3e, 3e formed in the side portions 3b of the moveable rail 3. The main rollers 5, 5 are in contact with the bottom walls 6, 6 formed on the fixed rail 2, and roll on the bottom walls 6, 6 when the moveable rail 3 is moved.

Figure 4:
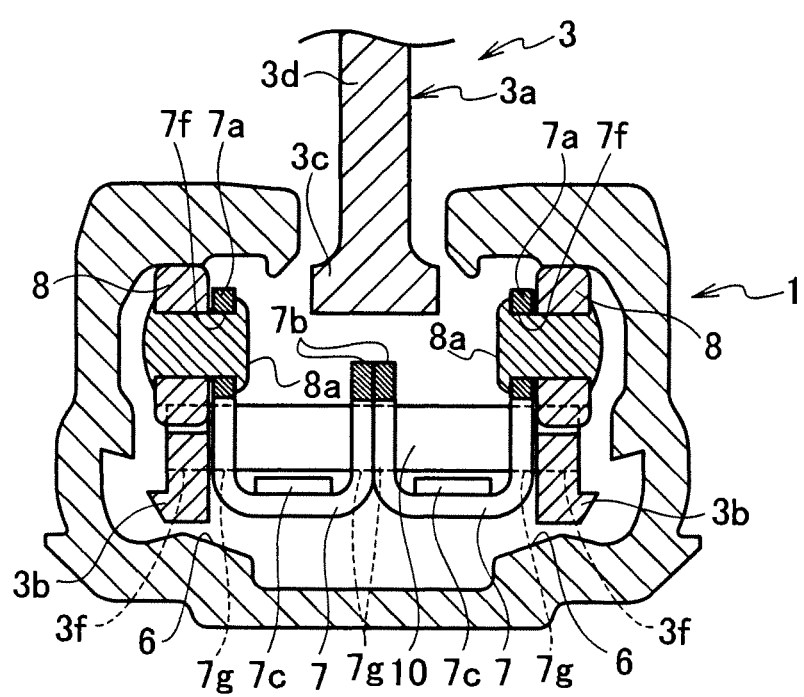
FIG. 4 is a cross-sectional view taken along a line IV-IV in FIG. 2.

The brackets 7, 7 are each formed in a U-shape in cross section with an opening facing upward. As illustrated in FIG. 4, each bracket 7 is formed longer at one side 7a than at the other side 7b. The other side 7b is arranged on the center side in a cross section in the left-right direction, while the one side 7a is arranged on the outer side in the cross section in the left-right direction. A pin 10 is press-fitted and supported in through-holes 3f, 3f formed in the side portions 3b of the moveable rail 3. Through-holes 7g, 7g which the pin 10 supported on the moveable rail 3 penetrates through are formed in the one side 7a and the other side 7b of each of the brackets 7, 7. With such a configuration, the brackets 7, 7 are supported in such a way as to be vertically turnable relative to the moveable rail 3.

An upwardly curved lever 7c is formed on one end portion 7d of each of the brackets 7, 7. The lever 7c is constantly pushed downward as illustrated by an outlined arrow in FIG. 2 by a plate spring 11 (biasing unit) attached to the moveable rail 3. That is, the plate spring 11 constantly applies rotational biasing force to the brackets 7, 7 in a counterclockwise direction about the pin 10. The biasing unit is not limited to the plate spring and may be a different type of spring.

The sub rollers 8 are supported on the brackets 7, 7 via shafts 8a, 8a rotatably supported in through-holes 7f, 7f formed in the other end portions 7e of the brackets 7, 7, in such a way as to be vertically turnable, and are also capable of rolling on the top walls 4, 4 of the fixed rail 2. Each sub roller 8 is constantly brought into pressure contact with the top wall 4 as illustrated by a black arrow in FIG. 2 by the constant rotational biasing of the one end portion 7d of each of the brackets 7, 7 in the counterclockwise direction by the plate spring 11.

According to the embodiment of the present invention, the sub rollers 8 are mounted to the brackets 7 in advance, so that the man-hours for assembly in the assembly line of the fixed rail 2 and other members are short. Accordingly, the processes of mounting various members are simplified.

According to the embodiment of the present invention, the brackets 7 including the sub rollers 8 are constantly rotationally biased in the counterclockwise direction by the plate spring 11 attached to the moveable rail 3. Thus, the sub rollers 8 rotatably supported on the brackets 7 are constantly in pressure contact with the top walls 4 of the fixed rail 2, while the main rollers 5 attached to the moveable rail 3 are in contact with the bottom walls 6 of the fixed rail 2. For this reason, no gap is formed between the sub rollers 8 and the top walls 4 of the fixed rail 2, and noises are therefore unlikely to be generated. Accordingly, the vehicle seat slide device 1 does not, or is not likely to, generate noises even in the presence of vibrations of the vehicle during travel.

Although the present invention has been described above by reference to the embodiments, the present invention is not limited to those, and various modifications can be made.

The invention claimed is:

1. A vehicle seat slide device, comprising: a fixed rail formed in a substantially U-shape in cross section with left and right opening edges bent inward in opposite directions and with a top wall substantially parallel with a bottom wall; a moveable rail arranged inside the opening edges of the fixed rail and capable of moving along the fixed rail; a main roller provided on each of opposite end portions of the moveable rail in a longitudinal direction of the moveable rail and capable of rolling on the bottom wall of the fixed rail upon movement of the moveable rail; a bracket vertically turnably supported on the moveable rail via a pin; a biasing unit attached to the moveable rail and constantly applying a rotational biasing force to the bracket about the pin by pushing one end portion of the bracket; a sub roller arranged on another end portion of the bracket on an opposite side of the pin from the one end portion and capable of rolling with the sub roller constantly in pressure contact with the top wall of the fixed rail in response to the rotational biasing force applied by the biasing unit; and a lever provided on the one end portion of the bracket, wherein the biasing unit is a plate spring which pushes the lever.

2. The vehicle seat slide device according to claim 1, wherein the bracket includes two bracket members that extend alongside each other along the longitudinal direction of the moveable rail.

3. The vehicle seat slide device according to claim 2, wherein the two bracket members are substantially parallel to each other along the longitudinal direction of the moveable rail.

4. The vehicle seat slide device according to claim 2, wherein the two bracket members rotate congruently with each other about the pin.

5. The vehicle seat slide device according to claim 2, further comprising a second sub roller, wherein the sub roller and the second sub roller rotate about the same axis, wherein each of the bracket members supports either the sub roller or the second sub roller.

6. The vehicle seat slide device according to claim 2, wherein each of the bracket members has a substantially U-shape cross section taken along a plane substantially perpendicular to the longitudinal direction of the moveable rail, wherein each of the bracket members includes two side walls, wherein each of the two side walls of each of the bracket members includes a pin-bracket aperture that the pin extends through.

7. The vehicle seat slide device according to claim 6, wherein the sub roller and the second sub roller are each supported on shafts, wherein each of the side walls of each of the bracket members includes a shaft aperture, wherein each of the shafts extend through one of the bracket members through the respective shaft aperture.

8. The vehicle seat slide device according to claim 1, wherein the moveable rail includes two rail side portions that each include a pin-rail aperture, wherein the pin extends through each of the rail side portions through the respective pin-rail aperture.

9. The vehicle seat slide device according to claim 1, wherein the fixed rail and the moveable rail are seat rails.

10. The vehicle seat slide device according to claim 1, wherein the moveable rail is configured to attach with at least a portion of a vehicle seat.

* * * * *